United States Patent [19]

Ishikura

[11] Patent Number: 5,524,503
[45] Date of Patent: Jun. 11, 1996

[54] REMOTE OPERATION MECHANISM FOR STROLLER

[75] Inventor: Takashi Ishikura, Tokyo, Japan

[73] Assignee: Combi Corporation, Tokyo, Japan

[21] Appl. No.: 315,487

[22] Filed: Sep. 30, 1994

[30] Foreign Application Priority Data

Sep. 30, 1993 [JP] Japan .................. 5-057343 U

[51] Int. Cl.⁶ .................. B62B 7/08; B62B 9/20
[52] U.S. Cl. .................. 74/501.6; 74/526; 74/108; 74/489; 280/642; 280/647; 280/655.1; 16/115
[58] Field of Search .................. 16/115; 280/655.1, 280/642, 647, 650; 74/526, 501.6, 108, 506

[56] References Cited

U.S. PATENT DOCUMENTS 4,660,850  4/1987  Nakao et al. .................. 280/642

FOREIGN PATENT DOCUMENTS 0494701  7/1987  European Pat. Off. .......... B62B 7/08
0595096  5/1994  European Pat. Off. .......... B62B 9/20
1-297372  11/1989  Japan .................. 280/642
3-186474  8/1991  Japan .................. 280/642

OTHER PUBLICATIONS

Patent abstracts of Japan, vol. 15, No. 279 (M–1136), Jul. 16, 1991 and JP–A–03 096 474 (Aprica Kassai) *abstract*.

*Primary Examiner*—Karin L. Tyson
*Attorney, Agent, or Firm*—Sughrue, Mion, Zinn, Macpeak & Seas

[57] ABSTRACT

A remote operation mechanism for a stroller is disclosed in which a fail-safe mechanism is reset to its initial position so as to be interlocked for every remote operation without fail, to thereby be able to automatically lock preventing operation of the system. The remote operation mechanism for a stroller includes a frame, an opening/closing operation lever having an end operable for ascending and descending along the frame, a pulley rotatable so as to be interlocked with the ascending/descending operation of the operation lever, a lock plate, an ascension regulating plate, a lock plate reset spring, a stopper formed on the lock plate and an operating projection formed on the pulley, wherein the operating projection abuts against the back of the lock plate.

5 Claims, 3 Drawing Sheets

REMOTE OPERATION MECHANISM FOR STROLLER

FIELD OF THE INVENTION

The present invention relates to an operation mechanism for opening and closing various types of lock mechanisms arranged on a stroller. More particularly, the present invention is directed to a mechanism for remotely operating a lock mechanism on a stroller by an operation mechanism arranged in a handle pole of the stroller.

BACKGROUND OF THE INVENTION

A folding arrangement of a stroller and an arrangement allowing a handle pole erecting position to be selected either at the back of a baby seat or at the front thereof are known in the art.

Further, a mechanism for remotely controlling the opening and closing of a folding system locking mechanism and a handle pole erecting position locking mechanism by using an operation mechanism arranged in the middle of the handle pole is disclosed in, e.g., Japanese Utility Model Unexamined Publication No. 62-474.

Such remote operation mechanisms may cause accidents if erroneously operated on occasions other than required. Therefore, a remote operation mechanism is usually provided with a fail-safe system.

However, conventional fail-safe systems are operated and released manually with no mechanism for automatically resetting the fail-safe system to its original position. As a result, if the fail-safe system is not manually reset after the fail-safe system has been released and the lock mechanism arranged in the stroller has then been opened or closed, then the same danger of erroneous operation as in the case where no fail-safe mechanism is provided is likely to arise.

SUMMARY OF THE INVENTION

An object of the present invention is to provide a solution to the above problem. The present invention provides a remote operation mechanism for a stroller, in which a fail-safe mechanism is reset to its initial position so as to be interlocked with every single remote operation without fail and thereby be able to automatically lock an operation system.

The device according to the invention is applied to a remote operation mechanism for a stroller, which includes: a frame having a U-shaped section and an appropriate length; and opening/closing operation lever, a base end portion thereof being pivotally supported by the frame, the other end portion thereof being capable of ascending and descending along the frame; a pulley rotating so as to be interlocked with the ascending and descending operation of the opening/closing operation lever; and a lock plate sliding along an upper surface of the frame, a lower end portion of an ascension regulating plate formed on a side wall of the lock plate at an operating position of the lock plate being located atop a drive arm plate formed at the other end of the opening/closing operation lever. In such remote operation mechanism, a reset spring is stretched between a base end portion of the lock plate and the frame or a joint member; a stopper formed on a lower surface of the base end portion of the lock plate is selectively engaged with engaging grooves formed at an upper end of the frame; and an operating projection formed on a part of the pulley is abutted against the back of the lock plate.

DETAILED DESCRIPTION OF A PREFERRED EMBODIMENT

An embodiment of the device will now be described with reference to the drawings.

Figure 1:
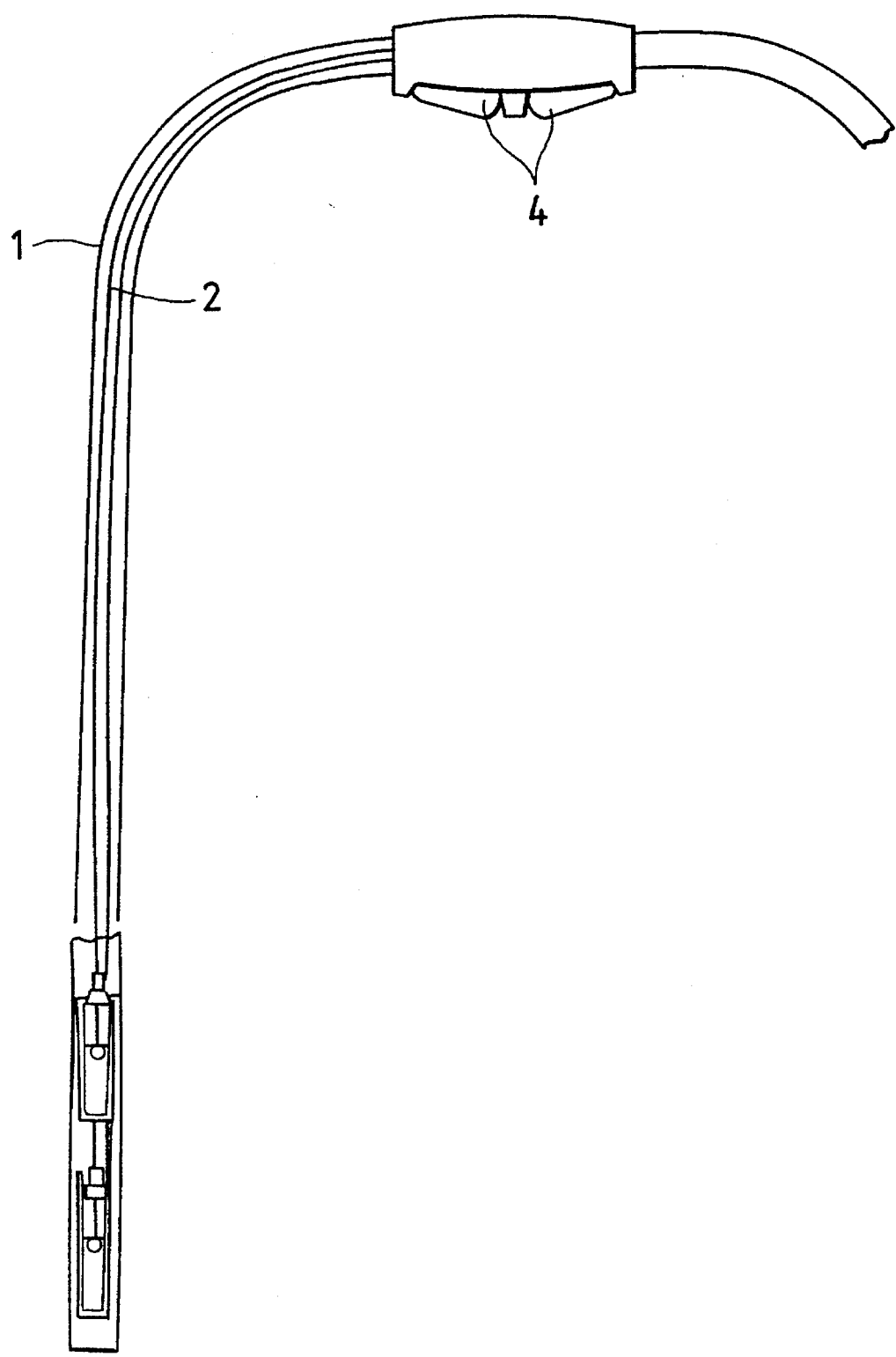
FIG. 1 is a front view of a partially omitted handle pole showing a remote operation mechanism attaching section.
Figure 2:
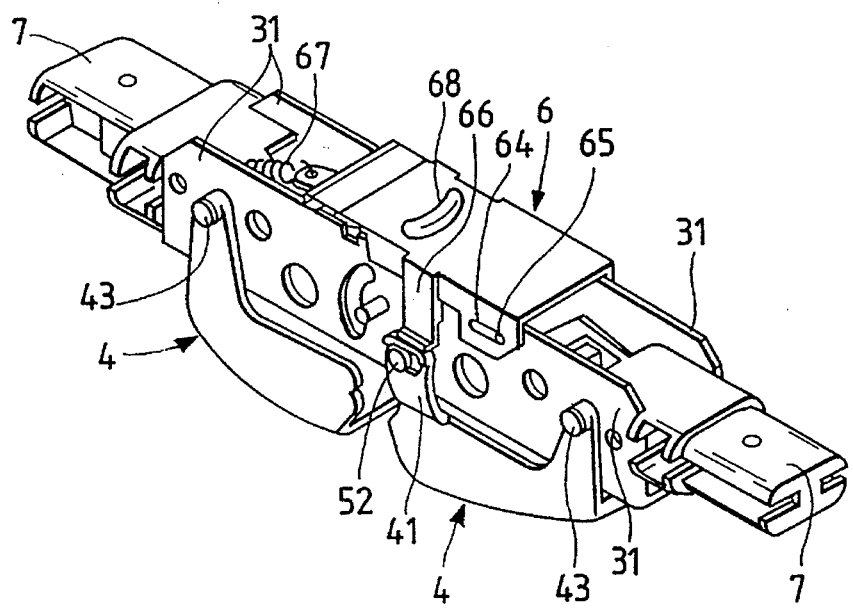
FIG. 2 is a perspective view of a remote operation mechanism.
Figure 3:
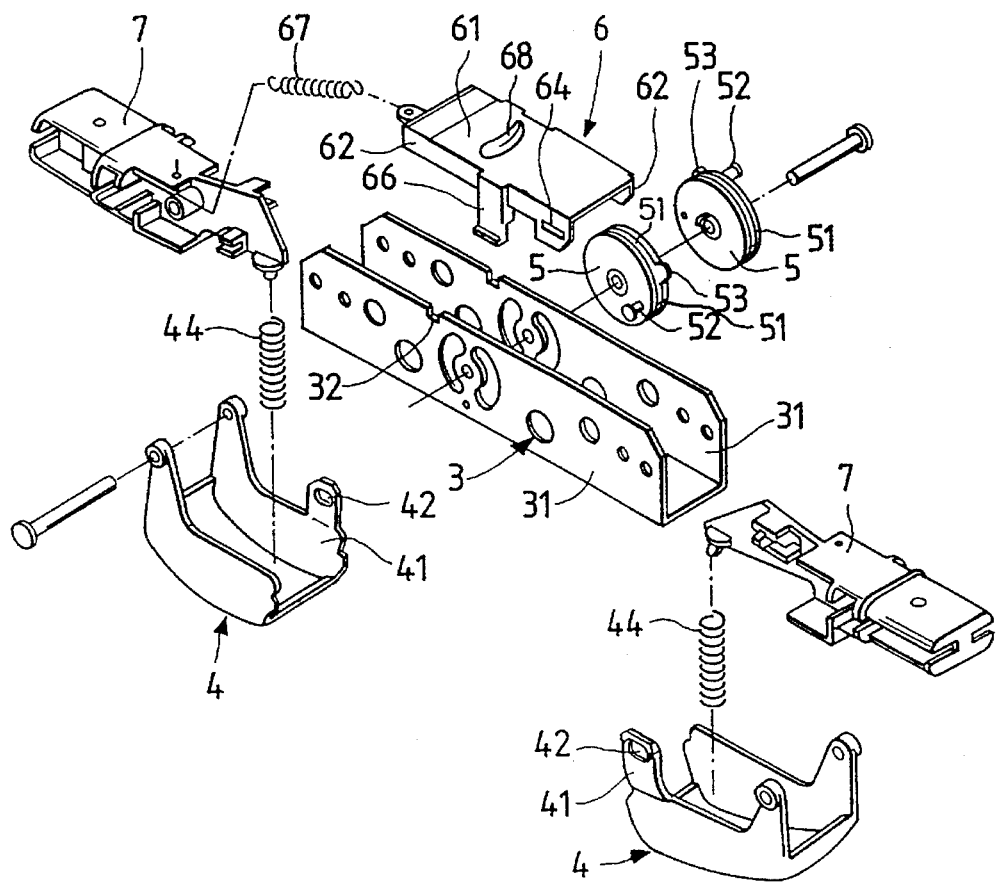
FIG. 3 is an exploded perspective view of the remote operation mechanism.
Figure 4:
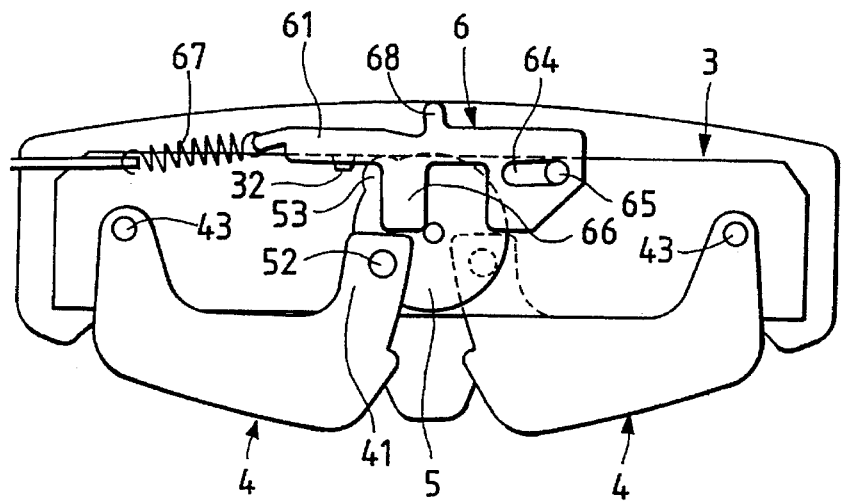
FIG. 4 is a schematic diagram showing the main portion of an opening/closing operation lever in a regulated state.

Referring to FIG. 1, a remote operation mechanism is designed to be attached to the middle of a handle pole 1 of a stroller. By winding and unwinding operating wire cables 2, 2 passing through the handle pole 1, a lock mechanism that retains the end portions of the respective operation cables 2, 2 is opened and closed.

As shown in FIGS. 2–6, the remote operation mechanism is formed of: a frame 3; opening/closing operation levers 4; pulleys 5 that rotate while interlocked with the operation of the opening/closing operation levers 4; and a lock plate 6 for regulating the ascending and descending of the opening/closing operation lever 4.

The frame 3 is connected to the handle pole 1 through joint members 7 that are to be attached to both end portions of the frame 3. The frame 3 is formed of a U-shaped frame member of an appropriate length, and pivotally supports the two pulleys 5, 5 through a shaft between two confronting wall surfaces 31, 31 thereof.

A rewinding guide groove 51 is formed along the circumference of each pulley 5 so that the corresponding operating wire cable 2 can be rewound, and a retaining portion (not shown) for retaining an end portion of the operating wire cable 2 is formed on a part thereof. From a side close to the outer circumference of the pulley 5 projects a retaining shaft 52 that is engageable with an engaging hole 42 formed in a drive arm plate 41 on an end of the corresponding opening/closing operation lever 4.

Reference numeral 53 designates an operating projection formed radially outward on a part of the circumference of each pulley 5. The operating projection 53 releases a neutral position of the lock plate 6 while abutted against the back of the lock plate 6. That is, when the pulley 5 has rotated, the operating projection 53 abuts against the back of the lock plate 6 that moved from an operating position to the neutral position (at which the locking is released) to raise the lock plate 6, so that the neutral position of the lock plate 6 can be released.

Each opening/closing operation lever 4 has a U-shaped section so that a front end portion thereof can ascend and descend along the side of the frame 3. The other base end portion of the opening/closing operation lever 4 is pivotally attached to the frame 3, allowing the engaging hole 42 formed in the drive arm plate 41 on the front end portion thereof to engage and retain the retaining shaft 52 projected from the side of the pulley 5.

Reference numeral 44 designates a reset spring of each opening/closing operation lever 4. Each reset spring 44 is stretched with resiliency given between the inner front end portion of the opening/closing operation lever 4 and the corresponding joint member 7 having the handle pole 1 arranged at the end portion of the frame 3, so that the front end portion of the opening/closing operation lever 4 is directed downward at all times (i.e., the direction in which the lever 4 does not perform the opening or closing operation).

The lock plate 6 is disposed on the frame 3 so as to be horizontally slidable along the upper surface of the frame 3. Low side walls 62, 62 are arranged on both sides of a top plate 61 so that the section of the lock plate 6 has a square U-shape. On the base end portion of the lock plate 6 is a stopper 63 (FIGS. 5–6) engageable with engaging grooves 32 formed at the frame 3.

Reference numeral 64 designates a horizontally long sliding guide groove formed at the front end portion of each side wall 62. Each sliding guide groove 64 has a retaining shaft 65 inserted therethrough so that the retaining shaft traverses the frame 3. The sliding guide groove 64 has a length coinciding with the sliding stroke of the lock plate 6. More specifically, the length of the sliding guide groove 64 is set so that when the retaining shaft 65 is positioned at the rightmost end of the sliding guide groove 64 (as viewed in FIG. 4), it is the operating position of the lock plate 6, whereas when the retaining shaft 65 is positioned at the leftmost end of the sliding guide groove 64 (as viewed in FIG. 5), it is the neutral position of the lock plate 6 in which the lock plate 6 is released.

A vertically long ascension regulating plate 66 is formed at a predetermined position on a part of each side wall 62 of the lock plate 6. The predetermined position is such that the lower end portion of the ascension regulating plate 66 abuts against the upper end of the drive arm plate 41 formed at the end of the opening/closing operation lever 4.

A reset spring 67 is interposed with a contracting force imposed between the base end portion of the lock plate 6 and the joint member 7, so that the lock plate 6 is urged to be reset to the original position (operating position) at all times.

Reference numeral 68 designates an operating projection formed on the surface of top plate 61. The operating projection 68 facilitates the lock plate 6 to be pushed out in the releasing direction.

The operation of the mechanism will now be described.

In the case when the lock plate 6 is not operated, the lock plate 6 is urged in the regulating direction at all times by the contracting force of the reset spring 67. As a result, as exemplified in FIG. 4, the lower end portions of the ascension regulating plates 66, 66 formed on both side surfaces of the top plate 61 are in the operating position for performing the locking function while positioned on top of the drive arm plates 41, 41 at the front ends of the opening/closing operation levers 4, 4 whose base end portions are pivotally supported by the frame 3, respectively. Accordingly, even if forces in the operating direction (the forces for causing the drive arm plates 41 to ascend) are exerted on the opening/closing operation levers 4, 4, the drive arm plates 41, 41 do not ascend, thus ensuring safe operation of the remote operation mechanism.

Figure 5:
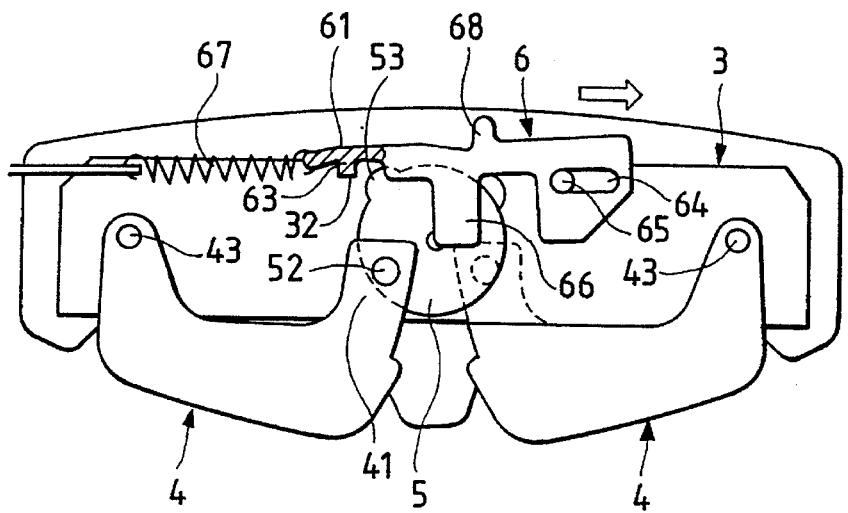
FIG. 5 is a schematic diagram showing the main portion of the opening/closing operation lever in a released state.
Figure 6:
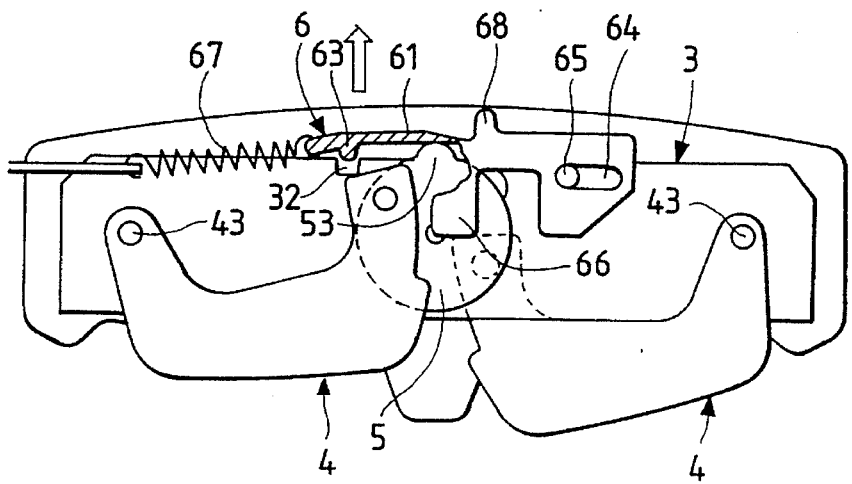
FIG. 6 is a schematic diagram showing the main portion of a lock plate whose retainment is released while interlocked with the operation of the opening/closing operation lever.

In the case when the opening/closing operation levers 3 are operated, if the lock plate 6 in the operating position is slid in the direction indicated by the arrow in FIG. 5, then the vertically long ascension regulating plate 66 formed on the side wall 62 moves from the upper end position of the drive arm plate 41 at the front end of the opening/closing operation lever 4 (lock position) to the neutral position so that the opening/closing operation lever 4 does not come in contact with the lock plate 6.

The base end portion of the lock plate 6 is urged so as to be pulled down at all times by the reset spring 67. Therefore, when the lock plate 6 is slid in the direction indicated by the arrow in FIG. 5, the stopper 63 formed at the base end portion (on the side where the reset spring 67 is retained) of the top plate 61 is engaged with the engaging grooves 32 formed at the upper end portions of the frame 3, thereby temporarily stopping the sliding of the lock plate 6 at the release position.

When the opening/closing operation lever 4 is operated under the above condition, the corresponding drive arm plate 41 retained in the end ascends to rotate the pulley 5, thereby pulling up the corresponding operating wire cable 2 and thereby allowing the remote operation.

The operating projection 52 formed at the circumferential edge of the pulley 5 pushes up the back of the top plate of the lock plate 6 (in the direction indicated by the arrow in FIG. 6) while interlocked with the above operation to thereby disengage the stopper 63 from the engaging grooves 32. When the operation of the opening/closing operation lever 4 is released, the lock plate 6 is automatically and instantaneously reset to the original position, thus allowing subsequent erroneous operation to be regulated.

As described above, the mechanism is characterized as not only regulating the operation of the opening/closing operation lever 4 when the lock plate 6 is set at the original position (operating position) and allowing the opening/closing operation lever 4 to operate only when the lock plate 6 is slid (moved to the neutral position), but also automatically resetting the lock plate 6 to the original position while interlocked with each operation of the opening/closing operation lever 4 to thereby lock the remote operation system. This provides an advantage not achievable by the conventional remote operation mechanism.

What is claimed is:

1. A remote operation mechanism for a stroller comprising:

a frame;

an opening/closing operation lever, a base end portion thereof being pivotally supported by said frame, and an other end portion thereof being operable for ascending and descending along said frame;

a pulley which is rotatable so as to be interlocked with the ascending and descending operation of said opening/closing operation lever; and lock plate reset plate mounted so as to be slidable along an upper surface of said frame;

an ascension regulating plate, a lower end portion thereof formed on a side wall of said lock plate at an operating position of the lock plate being located atop a drive arm plate formed at the other end of said opening/closing operation lever;

lock plate reset spring stretched between a base end portion of said lock plate and said frame;

a stopper formed on a lower surface of the base end portion of said lock plate, said stopper being selectively engaged with engaging grooves formed at an upper end of said frame; and an operating projection formed on said pulley, said operating projection abutting against the back of said lock plate.

2. The remote operation mechanism for a stroller according to claim 1, wherein said opening/closing operation lever receives a force for being reset to an original position by an opening/closing operation lever reset spring interposed between said opening/closing operation lever and said frame.

3. The remote operation mechanism for a stroller according to claim 1, wherein there are two opening/closing operation levers, and wherein operation of the two opening/closing operation levers is regulated by said ascension regulating plate.

4. The remote operation mechanism for a stroller according to claim 2, wherein there are two opening/closing operation levers, and wherein operation of the two opening/closing operation levers is regulated by said ascension regulating plate.

5. The remote operation mechanism for a stroller according to claim 2, wherein said frame comprises:

a U-shaped member having an end;

a joint member attached to said end of said U-shaped member, wherein said opening/closing operation lever reset spring is interposed between said operation lever and said joint member, and wherein said lock plate reset spring is stretched between said base end portion of said lock plate and said joint member.

* * * * *